United States Patent [19]
Gebhardt

[11] 3,905,470
[45] Sept. 16, 1975

[54] STOW ROLLER TRAIN

[76] Inventor: Richard Gebhardt, H. Thomastrasse 10, 6920 Sinsheim, Germany

[22] Filed: Oct. 20, 1971

[21] Appl. No.: 191,028

[30] Foreign Application Priority Data
Oct. 26, 1970 Germany............................ 2052418

[52] U.S. Cl............................................. 198/127 R
[51] Int. Cl.².......................................... B65G 13/02
[58] Field of Search.................................... 198/127

[56] References Cited
UNITED STATES PATENTS

| | | | |
|---|---|---|---|
| 2,288,379 | 6/1942 | Vredenburg | 198/127 R X |
| 3,064,797 | 11/1967 | Besel et al. | 198/127 R X |
| 3,122,232 | 2/1964 | Burt | 198/127 R |
| 3,225,901 | 12/1965 | Heinisch | 198/195 |
| 3,255,865 | 6/1966 | Sullivan | 198/127 R |
| 3,275,124 | 9/1966 | Lutes et al. | 198/127 R |
| 3,368,662 | 2/1968 | Poerink | 198/195 X |
| 3,598,225 | 8/1971 | Merrick | 198/127 R |
| 3,631,967 | 1/1972 | Converse et al. | 198/127 R X |

FOREIGN PATENTS OR APPLICATIONS
2,008,396  1/1970  France........................ 198/127

*Primary Examiner*—Evon C. Blunk
*Assistant Examiner*—Joseph E. Valenza
*Attorney, Agent, or Firm*—Craig & Antonelli

[57] ABSTRACT

A stow roller train for the transportation of articles without jamming having load carrying rollers, driving means and intermediate rollers selectively drivingly connecting the driving means to the load carrying rollers. The intermediate rollers are mounted for movement between a driving position and an idling position and are controlled by an adjusting means responsive to a feeler which senses the movement of the conveyed articles. The intermediate rollers are also provided with limited individual movement with respect to the positioning by the adjusting means in order to provide a maximized and uniform drive transmission.

13 Claims, 5 Drawing Figures

INVENTOR
RICHARD GEBHARDT
BY Craig, Antonelli & Hill
ATTORNEYS

STOW ROLLER TRAIN

This invention relates to a conveyor in the form of a stow roller train for the storage and conveyance of articles without jamming of the articles and more particularly to a roller train having rotatable article carrying rollers which can be selectively driven by a constantly rotating drive means via an associated adjustable intermediate roller, the rollers being combined into groups in which the intermediate rollers of each group are placed into a driving position or an idling position by means of a feeler responsive to the conveyed articles.

Known types of stow roller trains generally have the intermediate rollers of one group of rollers mounted in a rigid frame and controlled by means of the feeler, so that the intermediate rollers, in the driving position, are pressed against the article or load carrying rollers and, in the idling position, are maintained in a spaced-apart relationship with respect to the load carrying rollers. Since both types of rollers in the group exhibit varying dimensions due to manufacturing tolerances and also differing spacings, which differences are further increased by wear and tear due to usage of the conveyor, a uniform drive of all load carrying rollers is not ensured. Due to differences in contact pressure, there is either too much or too little mutual pressure contact between the driving means and the intermediate roller and/or between the intermediate roller and the load carrying roller. Consequently, the application of driving forces from the driving means to the load carrying roller and thus to the conveyed articles takes place in a nonuniform and insufficient manner. In addition to the occurrence of increased wear and tear, the articles are not sufficiently accelerated, so that the conveying process becomes irregular. This, in turn, results in an inefficient utilization of the storage capacity of the stow roller train.

These disadvantages are overcome by the present invention in that there is provided a stow roller train conveyer in which each intermediate roller is individually mounted on an adjustable member for movement between the driving position and idling position and each intermediate roller of a group of rollers is connected with the associated feeler by an adjusting means such that a uniform and optimal drive transmission is effected.

In one embodiment of the present invention, the adjusting means is in the form of articulated members for transmitting the control forces to the intermediate rollers and the intermediate rollers are mounted to provide limited freedom of adjustment between the load carrying roller and the driving means relative to the adjusting means so as to obtain a particularly sensitive adjustment and high drive force transmission.

In accordance with the present invention, the limited adjustability of each intermediate roller may be obtained by different mounting arrangements for the intermediate roller. In one arrangement, the intermediate roller is mounted on an axle having one end pivotably mounted at the frame of the stow roller train. In another arrangement, the adjustment means is in the form of a rail having notches forming a bearing for the roller and permitting adjustment of the roller between abutments forming opposite ends of the notch. In still another arrangement, the intermediate roller is mounted to a hinged lever pair for providing limited individual adjustment with respect to the adjustment means.

It is therefore an object of the present invention to provide a stow roller train which overcomes the disadvantages of the prior art.

It is another object of the present invention to provide a stow roller train having maximum and uniform drive forces transmitted to the load carrying rollers.

It is a further object of the present invention to provide intermediate rollers having limited individual movement with respect to the adjusting means.

These and other objects, features and advantages of the present invention will become more obvious from the following description when taken in conjunction with the accompanying drawings, wherein.

Figure 1:
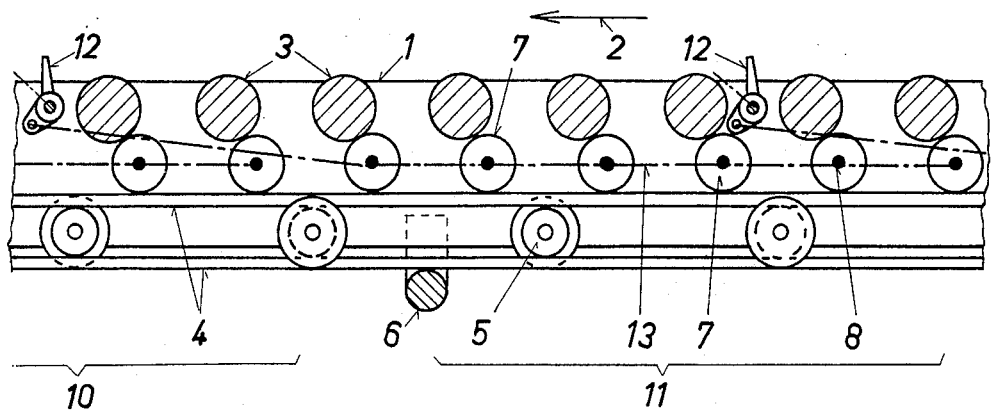
FIG. 1 is a longitudinal sectional view of the stow roller train of the present invention.

Referring now to the drawings wherein like reference numerals are used throughout the various views to designate like parts and more particularly to FIG. 1, there is shown a stow roller train having parallel rails 1 forming a frame in which rollers 3 are rotatably mounted for carrying the articles to be conveyed in the direction of the arrow 2. Below the rollers 3, a driving means 4, which is preferably a V-belt, rotates continuously. The upper side of the belt 4 is supported by a series of supporting rollers 5 arranged in spaced relationship, while the lower side of the belt is carried by small return rollers 6. As shown, a plurality of intermediate rollers 7 travel on the belt 4 and are mounted on axles 8 in a freely rotatable manner. These axles 8 can be pivoted about a bearing 15 in a rail 9 fixedly secured to the frame, so that the intermediate rollers 7 can be adjusted in the radial direction. In order to keep the angular deviation with respect to the longitudinal direction of the drive belt 4 small, the axles 8 are designed to be as long as possible. These axles 8 are easily mounted by inserting the bent end thereof in the bores of the bearings 15.

Figure 2:
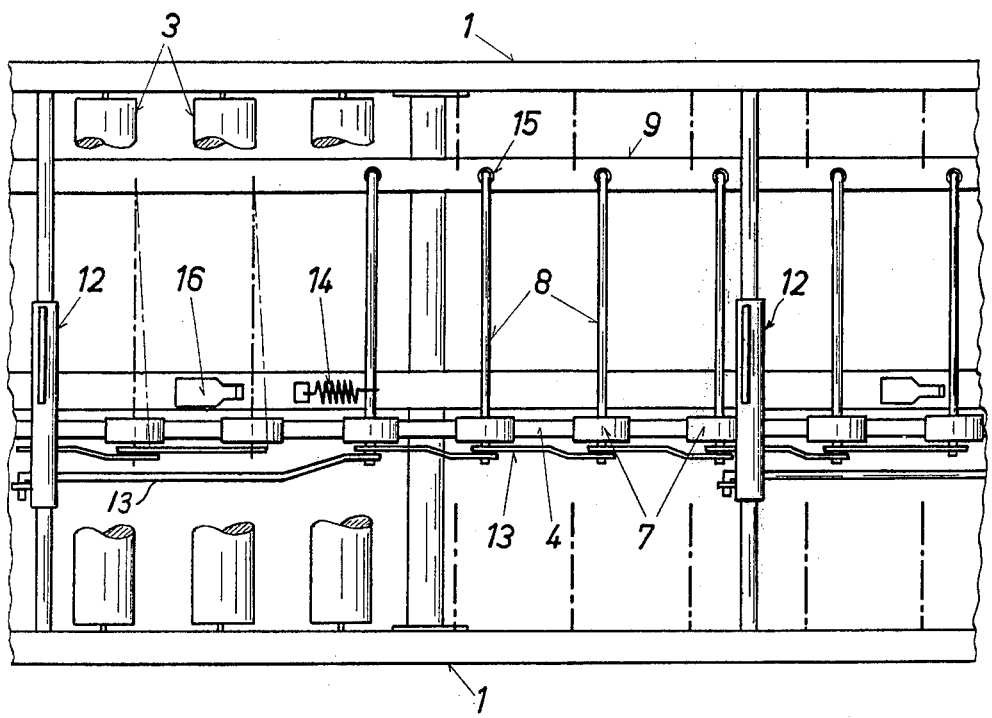
FIG. 2 is a partial plan view of the stow roller train.
Figure 3:
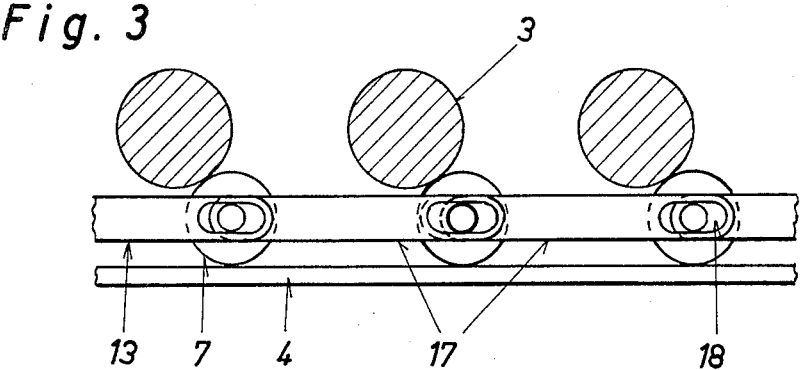
FIG. 3 illustrates a first mounting arrangement for the intermediate rollers.

The load carrying rollers 3 are combined into roller groups 10 and 11 with a feeler or probe 12 being associated with each group and being pivotably mounted in the frame. The feeler extends beyond the rollers 3 into the path of motion of the articles and is pivoted by the articles from an upward driving position into a lowered release position, as indicated in dot-dash lines in FIG. 1. As shown in FIG. 2, the feeler 12 is connected via an adjusting means 13 with the axles 8 and/or the holders thereof of the associated group of rollers. In the present embodiment, the adjusting means 13 is formed by articulated link members which provide the maximum inherent adjustment freedom possible for the intermediate rollers 7. Thus, the intermediate rollers 7 can be adjusted in accordance with the varying load conditions. Moreover, an additional inherent adjustability of the intermediate rollers 7 can be attained by constructing the bearing of the intermediate roller 7 in such a manner that the roller is independently movable with respect to the adjusting means 13 in the adjustment direction. This can be achieved, for example as shown in FIG. 3, by providing a slotted bearing member for the roller. In addition, springs, not shown, may be provided for holding the axle 8 in a predetermined neutral position such as in the center of the slot.

Referring to FIG. 2, there is shown a spring 14 connected to an axle 8 of each group of rollers 10, 11 which biases the intermediate rollers 7 toward the illustrated driving position, wherein the intermediate rollers 7 are set into rotation by the driving means 4, and in turn cause rotation of the load carrying rollers 3. However, when the articles press the feeler 12 downwardly in the counterclockwise direction, the intermediate rollers 7 are shifted toward the right, as indicated by the representation of the axles 8 in dot-dash lines in FIG. 2, and come out of contact with the rollers 3 so that the movement of these rollers is arrested. In order to obtain a satisfactory power transmission, the intermediate rollers 7 are disposed in each case between two adjacent supporting rollers 5. Due to the elastic resiliency of the driving means 4 and the individual movability of the intermediate rollers 7, the rollers have a greater extent of downward movement between the driving means 4 and the roller 3, resulting in increased contact pressure with a correspondingly improved drive transmission. Overstresses resulting from too much contact pressure are avoided by means of an abutment 16 formed on a rail of the frame. As shown, an axle 8 of the group of rollers 10, 11 is arranged for contacting this abutment in the final permissible forward position of the intermediate roller 7.

Figure 4:
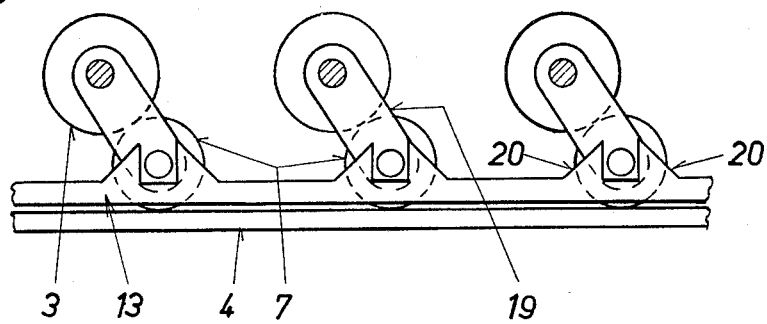
FIG. 4 illustrates a second mounting arrangement for the intermediate rollers.

In the embodiment of FIGS. 2 and 3, the adjusting means 13 is formed of individual articulated links 17 having a lost motion connection formed by apertures or slots 18 with the axle 8 of one intermediate roller 7 inserted in one slot and the axle 8 of the adjacent intermediate roller 7 mounted in the other slot. As shown, the apertures serve as bearing members for the intermediate rollers with the apertures on the ends of each link being of different size. Thus, each intermediate roller 7 can execute an arbitrary inherent adjustment between the load carrying roller 3 and the driving means 4, in addition to the controlled adjusting movement due to the lost motion connection. It is, of course, also possible to mount the intermediate rollers 7 in a radially adjustable position in some other manner. Thus, in FIG. 4, for example, the intermediate rollers 7 are carried by levers 19 serving as the bearing member and mounted for pivotal movement about the axis of the rollers 3 so that the intermediate rollers can be swung downwardly from an uplifted idling position, thus contacting the driving means 4 and being set into rotation thereby. The adjustment means 13 utilized in this embodiment is constructed as a rigid rail extending over a group of rollers 10, 11 and actuated by the associated feeler 12. In this arrangement, the axles of the intermediate rollers 7 can be mounted to permit a certain amount of play between abutments 20 of the rail.

Figure 5:
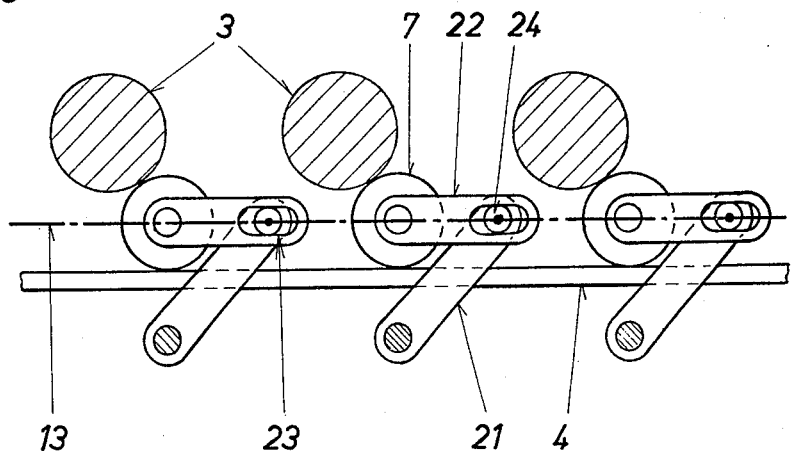
FIG. 5 illustrates a third mounting arrangement for the intermediate rollers.

Referring to FIG. 5, there is shown another embodiment of the present invention in which each intermediate roller 7 is mounted to a hinged lever pair 21, 22, the lever 21 being pivotably mounted at the frame. The articulated connection between the two levers 21 and 22 is formed as a slotted aperture 23 in order to ensure the free adjustability of the intermediate roller. The adjustment means 13 is connected to the levers 21, particularly to the pins 24 at the slotted aperture 23 to provide adjustment for the roller group.

The advantages attained by the present invention reside particularly in that each intermediate roller exhibits the maximum possible inherent adaptability for the adjustment between the load carrying roller and the driving means, thus obtaining high power transmission which is uniform over the entire roller train. The intermediate roller is individually adjusted in accordance with the installation conditions, as well as to the instantaneously required power transmission, by pressing to a greater or smaller extent between the load carrying roller and the driving means. Thereby, a high power transmission to the load carrying rollers, as well as a correspondingly high acceleration of the conveyed articles, are achieved. Furthermore, the spacings between the individual articles are kept uniform so that the stow roller train exhibits a close succession of articles and thus a high storage capacity without jamming of the articles. Accordingly, in addition to offering increased safety while providing for an accelerated transportion of the articles, the stow roller train of this invention affords an improved utilization of the storage space.

It should be noted that although the embodiments of the present invention have been described as utilizing a spring 14 for each of the roller groups, each of the rollers 7 of the roller group may be provided with a biasing spring. Likewise in the embodiments of FIGS. 3–5, a single spring for each roller group or each roller 7 may be provided. In addition, the spring may be secured to an axle of a roller or to the adjustment means 13 for biasing the rollers of each roller group.

Obviously, many modifications and variations of the present invention are possible in the light of the above teachings. It should therefore be understood that within the scope of the apended claims, the invention may be practiced otherwise than as specifically described.

I claim:

1. A stow roller train for the storage and transportation of articles without jamming of such articles comprising: frame means, load carrying rollers for conveying the articles rotatably mounted in said frame means, driving means for rotating said load carrying rollers, intermediate rollers for selectively drivingly connecting said driving means to said load carrying rollers, each of said intermediate rollers being associated with a respective one of said load carrying rollers, said load carrying rollers and said intermediate rollers being combined to form groups of rollers, means for mounting each of said intermediate rollers for individual movement between a driving position and an idling position, feeler means associated with each of said groups of rollers and responsive to the conveyed articles for controlling the positioning of said intermediate rollers of each of said groups of rollers, and adjusting means connected between said feller means and said intermediate rollers of each of said groups for adjusting the position of said intermediate rollers between said driving position and said idling position and for permitting limited movement of said intermediate rollers in radial directions in response to said feeler means, said adjusting means comprises individual links connecting adjacent intermediate rollers of said groups of rollers.

2. A stow roller train for the storage and transportation of articles without jamming of such articles, comprising: frame means, load carrying rollers for conveying the articles rotatably mounted in said frame means, driving means for rotating said load carrying rollers, intermediate rollers for selectively drivingly connecting said driving means to said load carrying rollers, each of said intermediate rollers being associated with a respective one of said load carrying rollers, said load carrying rollers and said intermediate rollers being combined to form groups of rollers, means for mounting each of said intermediate rollers for individual movement between a driving position and an idling position, feeler means associated with each of said groups of rollers and responsive to the conveyed articles for controlling the positioning of said intermediate rollers of each of said groups of rollers, and adjusting means connected between said feeler means and said intermediate rollers of each of said groups for adjusting the position of said intermediate rollers between said driving position and said idling position and for permitting limited movement of said intermediate rollers in radial directions in response to said feeler means, said adjusting means is provided with a plurality of apertures, said mounting means for said intermediate rollers includes axle means for permitting individual radial movement of said intermediate rollers, one end of said axle means being secured to said frame and pivotable with respect thereto, and the other end of said axle means being disposed in a respective aperture to permit limited movement of said intermediate rollers with respect to said adjusting means.

3. A stow roller train for the storage and transportion of articles without jamming of such articles, comprising: a frame means, load carrying rollers for conveying the articles rotatably mounted in said frame means, driving means for rotating said load carrying rollers, intermediate rollers for selectively drivingly connecting said driving means to said load carrying rollers, each of said intermediate rollers being associated with a respective one of said load carrying rollers, said load carrying rollers and said intermediate rollers being combined to form groups of rollers, means for mounting each of said intermediate rollers for individual movement between a driving position and an idling position, feeler means associated with each of said groups of rollers and responsive to the conveyed articles for controlling the positioning of said intermediate rollers of each of said groups of rollers, and adjusting means connected between said feeler means and said intermediate rollers of each of said groups for adjusting the position of said intermediate rollers between said driving position and said idling position and for permitting limited movement of said intermediate rollers in radial directions in response to said feeler means, said adjusting means is in the form of articulated members connected to said intermediate rollers, each of said intermediate rollers being movable with respect to said adjusting means between said driving means and said load carrying rollers.

4. A stow roller train as defined in claim 2 including spring means connected to said mounting means for said intermediate rollers for biasing said intermediate rollers into the driving position.

5. A stow roller train as defined in claim 2 wherein said driving means is a constantly rotating V-belt and a plurality of spaced supporting rollers carries said belt, at least one of said intermediate rollers being arranged between adjacent ones of said supporting rollers.

6. A stow roller train as defined in claim 5, wherein two intermediate rollers are arranged between said adjacent supporting rollers.

7. A stow roller train for the storage and transportation of articles without jamming of such articles comprising: frame means, load carrying rollers for conveying the articles rotatably mounted in said frame means, driving means for rotating said load carrying rollers, intermediate rollers for selectively drivingly connecting said driving means to said load carrying rollers, each of said intermediate rollers being associated with a respective one of said load carrying rollers, said load carrying rollers and said intermediate rollers being combined to form groups of rollers, means for mounting each of said intermediate rollers for individual movement between a driving position and an idling position, feeler means associated with each of said groups of rollers and responsive to the conveyed articles for controlling the positioning of said intermediate rollers of each of said groups of rollers, and adjusting means connected between said feeler means and said intermediate rollers of each of said groups for adjusting the position of said intermediate rollers between said driving position and said idling position and for permitting limited movement of said intermediate rollers in radial directions in response to said feeler means, said adjusting means is provided with a plurality of apertures, said mounting means includes a plurality of axles, each of said axles carrying one of said intermediate rollers, said frame means being provided with a plurality of bearings, one end of each of said axles being disposed in a respective one of said bearings such that said axles are radially pivotable about said bearings and the other end of said axles being disposed in one of said apertures to permit limited movement of said intermediate rollers with respect to said adjusting means.

8. A stow roller train as defined in claim 7, wherein each of said intermediate rollers is positioned proximate to the end of the axle opposite said bearings to permit maximum radial movement thereof.

9. A stow roller train as defined in claim 2, wherein said intermediate rollers are in constant engagement with said driving means and movement of said intermediate rollers between the driving position and the idling position is effected by movement of said rollers along said driving means.

10. A stow roller train for the storage and transportation of articles without jamming of such articles, comprising: frame means, load carrying rollers for conveying the articles rotatably mounted in said frame means, driving means for rotating said load carrying rollers, intermediate rollers for selectively drivingly connecting said driving means to said load carrying rollers, each of said intermediate rollers being associated with a respective one of said load carrying rollers, said load carrying rollers and said intermediate rollers being combined to form groups of rollers, means for mounting each of said intermediate rollers for individual movement between a driving position and an idling position, feeler means associated with each of said groups of rollers and responsive to the conveyed articles for controlling the positioning of said intermediate rollers of each of said groups of rollers, and adjusting means connected between said feeler means and said intermediate rollers of each of said groups for adjusting the position of said intermediate rollers between said driving position and said idling position and for permitting limited movement of said intermediate rollers in radial directions in response to said feeler means, said adjusting means is provided with a plurality of apertures, each of said apertures having a part of said mounting means for said intermediate rollers arranged therein to permit limited movement of said intermediate rollers in at least two directions with respect to said adjusting means.

11. A stow roller train as defined in claim 10, wherein said apertures are in the form of slots and serve as bearings for said intermediate rollers.

12. A stow roller train for the storage and transportation of articles without jamming of such articles, comprising: frame means, load carrying rollers for conveying the articles rotatably mounted in said frame means, driving means for rotating said load carrying rollers, intermediate rollers for selectively drivingly connecting said driving means to said load carrying rollers, each of said intermediate rollers being associated with a respective one of said load carrying rollers, said load carrying rollers and said intermediate rollers being combined to form groups of rollers, means for mounting each of said intermediate rollers for individual movement between a driving position and an idling position, feeler means associated with each of said groups of rollers and responsive to the conveyed articles for controlling the positioning of said intermediate rollers of each of said groups of rollers, and adjusting means connected between said feeler means and said intermediate rollers of each of said groups for adjusting the position of said intermediate rollers between said driving position and said idling position and for permitting limited movement of said intermediate rollers in radial directions in response to said feeler means, said mounting means for said intermediate rollers includes a pair of lever members having an articulated connection at one end thereof, the other end of one of said members being connected to said intermediate roller and the other end of said other member being connected to said frame means.

13. A stow roller train as defined in claim 12, wherein said articulated connection is provided by a pin mounted on one of said lever members and disposed in a slotted guide arranged within the other lever member, said adjusting means being connected to the lever member connected to said frame means.

* * * * *